United States Patent [19]
Wilkins et al.

[11] Patent Number: 5,730,185
[45] Date of Patent: Mar. 24, 1998

[54] PRESSURE LOCKING DISPENSER HALF

[75] Inventors: Steven Wilkins, Union City; Wayne Wilcox, Waterford; Douglas F. Hopson, Union City, all of Pa.

[73] Assignee: Snap-Tite, Inc., Union City, Pa.

[21] Appl. No.: 551,921

[22] Filed: Oct. 23, 1995

[51] Int. Cl.$^6$ ................................................. F16L 29/00
[52] U.S. Cl. ........................ 137/614.2; 137/614.05; 251/325
[58] Field of Search ................... 137/614, 614.05, 137/614.2; 251/149.6, 325; 285/302

[56] References Cited

U.S. PATENT DOCUMENTS

| | | | |
|---|---|---|---|
| 3,236,251 | 2/1966 | Hansen | 137/614.05 |
| 4,592,387 | 6/1986 | Rogers | 137/614.05 X |
| 5,323,812 | 6/1994 | Wayne | 137/614.05 |
| 5,385,331 | 1/1995 | Allread et al. | 251/149.6 X |

Primary Examiner—Kevin Lee
Attorney, Agent, or Firm—Woodling, Krost & Rust

[57] ABSTRACT

A pressure locking dispenser half which securely locks with a receptacle half which comprises a connector, a barrel sleeve, and a moveable adaptor. The connector includes first and second passageways. The first passageway of the connector further includes a first port and the second passageway includes a second port, a first seal and a second seal residing between the connector and the adaptor. The adaptor engages the barrel sleeve. The barrel and adaptor include a vent passageway. A spacer resides between the first and second seals maintaining separation of the first and second seals. The moveable adaptor positions the first and second seals in one of a plurality of positions with respect to the connector. A dispenser valve 12 acts in combination with a retainer, a sliding sleeve, and a locking sleeve to pressure lock the dispenser half and the receptacle half together under certain circumstances. Certain positions of the adaptor allow the venting of the dispenser half and the receptacle half.

45 Claims, 10 Drawing Sheets

PRESSURE LOCKING DISPENSER HALF

FIELD OF THE INVENTION

This invention relates to compressed natural gas vehicle fueling connection devices. In particular the invention is a gas dispenser. The dispenser is connected to a gas supply source. Typically the gas supply source is at an approximate pressure of 3,000 psi gauge or greater.

BACKGROUND OF THE INVENTION

It has become necessary in certain areas of the United States to switch from gasoline powered vehicles to either propane or natural gas powered vehicles. U.S. Pat. No. 5,323,812 to Wilcox issued Jun. 28, 1994 cites environmental concerns in regard to the need to switch from gasoline to natural gas or propane powered vehicles. The American National Standards Institute has set forth certain criteria for nozzles which dispense the natural gas into a vehicle. The present invention is a nozzle, otherwise referred to herein as a dispenser half, for use with dispensing hoses that remain fully pressurized at dispenser shutdown. The present invention provides a vent path which vents the trapped Was remaining in the nozzle to a storage chamber for further recycling. The present invention provides that the trapped natural gas is safely vented to the recycling chamber prior to nozzle disconnection.

U.S. Pat. No. 5,323,812 to Wilcox discloses and claims a pressure locked coupling. The present invention employs features of U.S. Pat. No. 5,323,812 to insure that the dispenser half is locked to the receptacle half.

The present invention meets the standards set forth by the American Gas Association laboratories, in particular, it meets the requirements of a type 1 nozzle as set forth in section 1.3.1 et seq. of the ANSI/AGA NGV1-1994 standard. The present invention permits the operator, typically a person refueling his or her car, to connect the dispenser half to the receptacle half of the coupling mechanism with use of a single hand. The present invention is lightweight and is easily connected to the receptacle half.

OBJECTS OF THE PRESENT INVENTION

It is an object of the present invention to provide a dispenser half, otherwise known as a nozzle, which is pressure locked to the receptacle half. It is a further object of the present invention to enable a person to connect the dispenser half and the receptacle half using only one hand. This is accomplished by holding the dispenser half with a single hand and urging it forcefully toward the receptacle half. Once the receptacle half enters the nozzle or dispenser half, a mechanical locking action is effected by the structure of the dispenser half together with the pressure that has been applied to the dispenser half.

It is an object of the present invention to provide a dispenser half which is continuously connected to a pressure source, a natural gas pressure source. It is anticipated that the natural gas pressure source will be at 3,000 psi gauge or greater. However other pressures may be used in different applications.

It is an object of the present invention to provide a dispenser half which is pressure balanced. The pressure balancing is effected by a first seal and a second seal maintained in a spaced apart relationship by a sleeve 26.

It is a further object of the present invention to provide a sealing arrangement having a first seal, a second seal, and a third seal which resides around one or more of a first and/or a second port in a connector. The sealing arrangement is designed such that the seals move in concert with an adaptor and a barrel sleeve.

It is an object of the present invention to provide a bumper which fixedly engages a barrel sleeve to an adaptor. The barrel sleeve has a slot in one end thereof. The slot communicates with a relief passageway in the adaptor. Further, under certain circumstances, the slot and relief passageway permit ventilation of the interior of the connector.

It is a further object of the present invention to provide a dispenser valve which opens and closes under the influence of the receptacle half with pressure being applied to the connector of the dispenser half.

It is a further object of the present invention to provide a connector having a first passageway and a second passageway therein. A first port communicates with the first passageway and leads to the exterior of the connector. A second port communicates with the second passageway and leads to the exterior of the connector.

It is a further object of the present invention to affix an intermediate member to the connector. Additionally, a body member is affixed to the intermediate member. The body member carries a plurality of first and second locking balls in circumferentially spaced apertures located in the body member.

It is a further object of the present invention to provide a coupler valve in combination with a retainer, a sliding sleeve, and first and second locking balls together with a locking sleeve which under certain circumstances permit the opening and closing of the dispenser valve.

It is a further object of the present invention to provide an adaptor fixedly connected to a barrel sleeve by means of a bumper. The bumper, barrel sleeve, and adaptor move as a unit. The barrel sleeve has a first end portion and a second end portion. A plurality of slots reside at the second end portion of said barrel sleeve. The barrel sleeve contains a milled edge at the second end portion thereof. The adaptor provides a relief passageway therein. The slot of the barrel sleeve communicates with the relief passageway of the adaptor. The bumper is fixedly connected to the adaptor and forcibly engages the barrel sleeve against and into engagement with the adaptor.

The foregoing objects and additional objects of this invention will become apparent when taken in conjunction with the Brief Description Of The Drawings given immediately hereinbelow followed by the description of the preferred embodiment of the invention and the claims.

BRIEF DESCRIPTION OF THE DRAWINGS

FIG. 1A illustrates the first, second, and third seals. FIG. 1A further illustrates the connector and the adaptor along with the barrel sleeve.

FIG. 2 illustrates, however, a temporary position of the dispenser half with respect to the receptacle half. FIG. 2 illustrates the vent position of the adaptor together with the first, second, and third seals. FIG. 2 also illustrates the communication of the first interior passageway 38' of the connector with the slot of the barrel sleeve and the relief passageway of the adaptor.

FIG. 2A illustrates the vent path for trapped gas to exit the dispenser half. Specifically, FIG. 2A illustrates a pathway from the first passageway 38' to the first port 29, past third seal 24, through slot 21 of the barrel sleeve, into annular area 50 formed by the barrel sleeve and the adaptor, and finally exiting relief passageway 37 in the adaptor.

FIG. 3 is a quarter sectional view illustrating the dispenser half 66 and the receptacle half 1 fully connected. FIG. 3 illustrates the adaptor, the barrel sleeve, and the bumper having moved in concert rightwardly such that the first seal 23 and the second seal 22 surround or are positioned about and seal the first port 29 and the second port 28 of the connector 17.

FIG. 3A represents the adaptor being positioned when the dispenser half and a receptacle half are fully connected.

FIG. 4 is similar to FIG. 1 except FIG. 4 illustrates the first locking balls 8 positioned prior to the entry of the receptacle half with respect to the dispenser half.

The foregoing brief description of the drawings will be better understood when taken in conjunction with the Description Of The Preferred Embodiment and the Claims which follow hereafter.

DESCRIPTION OF THE PREFERRED EMBODIMENT

Figure 1:
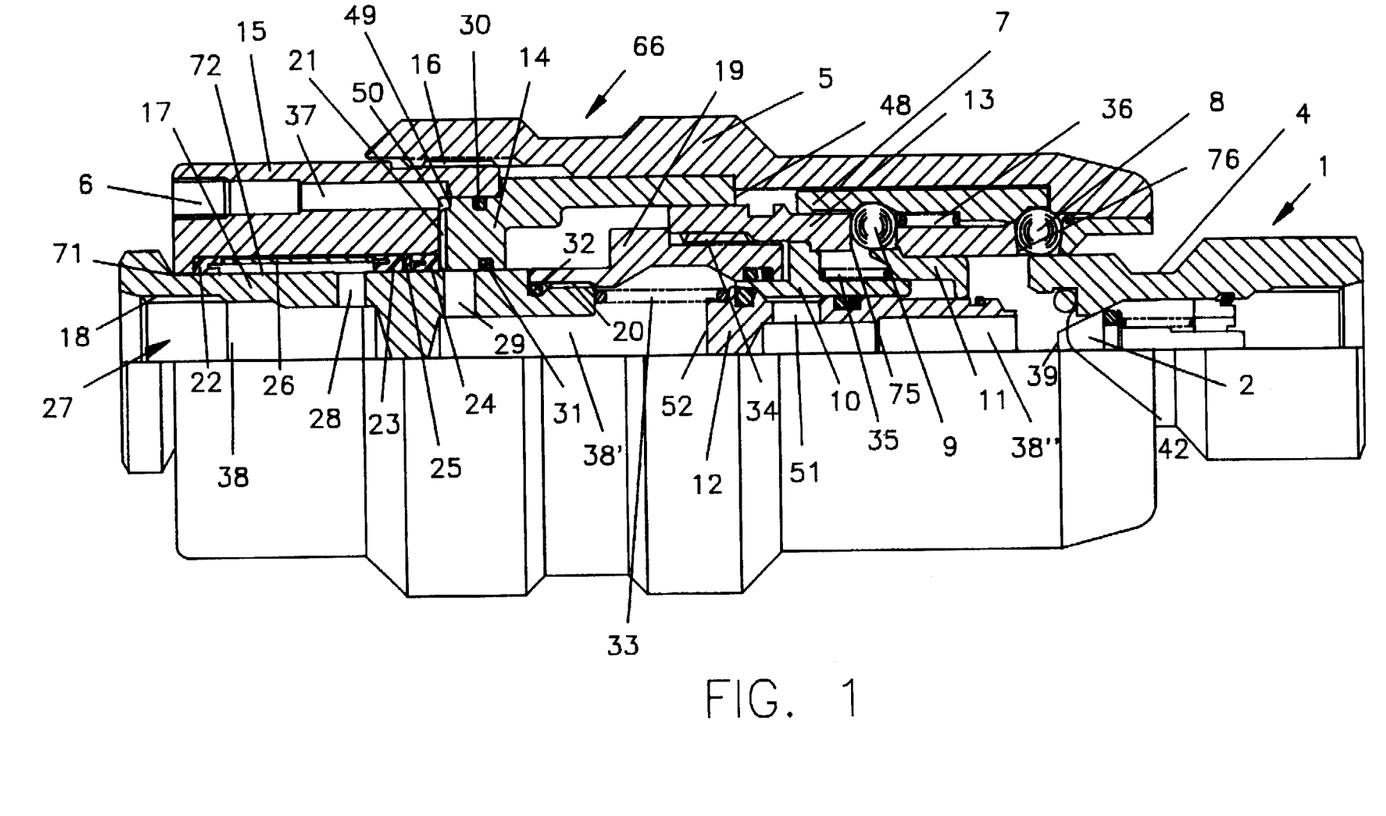
FIG. 1 illustrates the dispenser half as it is just beginning to engage the receptacle half.

FIG. 1 is a view of the dispenser half 66 and the receptacle half 1 as the receptacle half is being brought into engagement with the dispenser half 66. It will be noted from FIG. 1 that the adaptor 15 resides leftwardly and abuts the connector 17. Reference numeral 71 illustrates the point at which the adaptor abuts the connector 17. Connector 17 is a generally cylindrical member as can be seen from FIG. 1. The connector 17 comprises a first passageway 38' and a second passageway 38. The first passageway 38' includes a first port 29. In similar fashion the second passageway 38 includes a second port 28. The connector 17 further includes an exterior surface 72. The first port 29 leads from the first passageway 38' to the exterior 72 of the connector. Similarly the second port 28 leads from the second passageway 38 to the exterior of the connector 72. There may be any number of first or second ports in the connector 17.

The adaptor 15 is also generally cylindrically shaped. The adaptor has a return port 6 which leads to a passageway 37. The passageway 37 is a relief passageway as referred to herein.

Figure 1A:
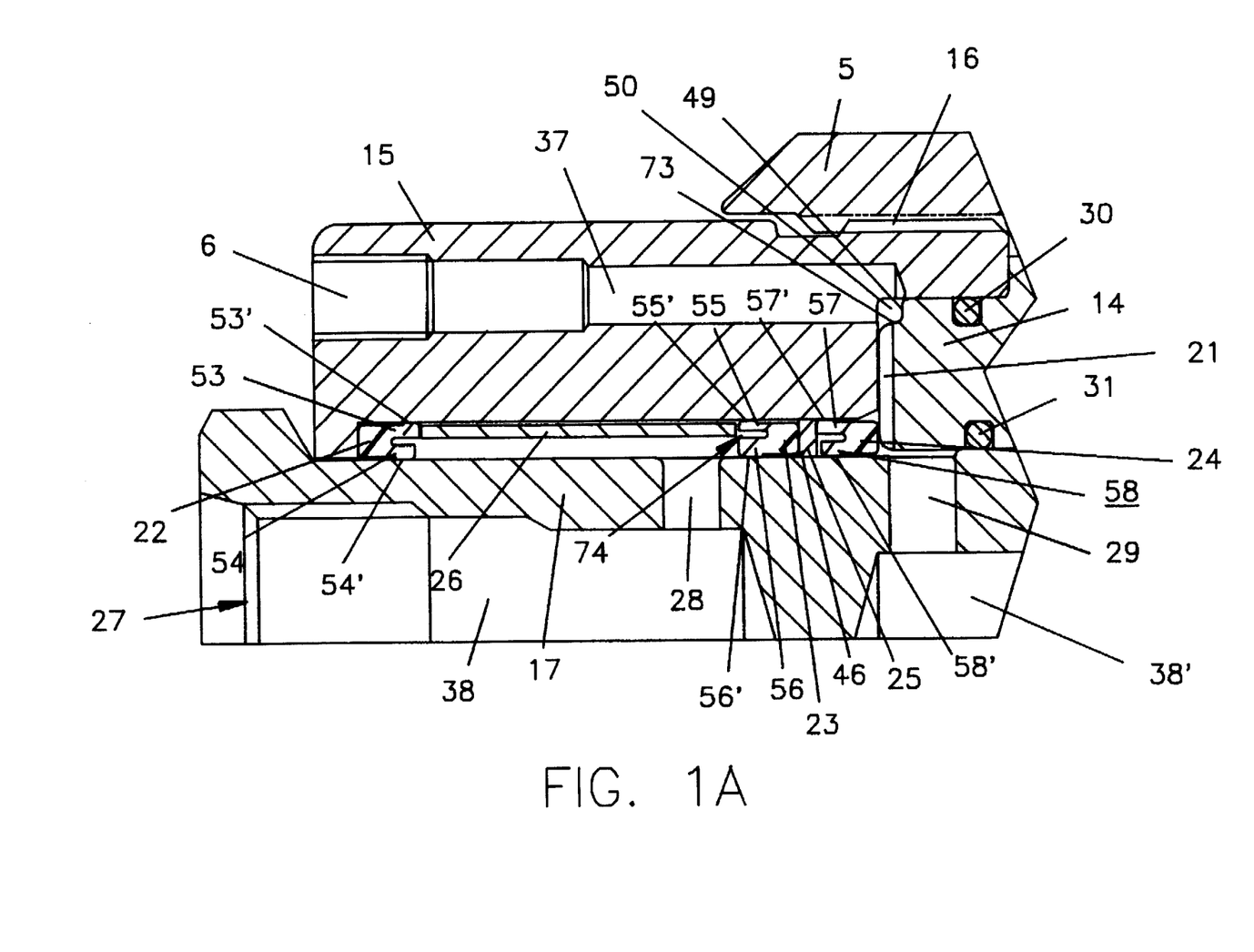
FIG. 1A is an enlarged cross-sectional view of a portion of the dispenser half and receptacle half as shown in FIG. 1. In particular.

Barrel sleeve 14 is a generally cylindrically shaped member having a first end portion 48 and a second end portion 49. The second end portion includes one or more slots 21 which will further described hereinafter. The second end portion 49 of the barrel sleeve 14 includes a beveled portion 73 on the second end portion 49 thereof. The beveled end portion is denoted by the reference numeral 73 as shown in FIG. 1A. Reference numeral 50 indicates an annular space or void which is formed when the barrel sleeve abuts the adaptor 15. The annular void will be discussed hereinbelow in connection with the venting of the dispenser half in combination with the slot 21 in the barrel sleeve 14. Annular void 50 permits assembly of the barrel sleeve with respect to the adaptor 15 in any position such that it is assured that a vent passageway will be established.

Bumper 5 is shown in FIG. 1. Bumper 5 engages the first end portion 48 of the barrel sleeve and fixedly positions the barrel sleeve up against the adaptor 15. Bumper 5 is threadably connected to the adaptor 15. Reference numeral 16 indicates the threaded interconnection of the bumper 5 and the adaptor 15. An elastomeric seal 30 is employed between the adaptor 15 and the barrel sleeve. Similarly an elastomeric seal 31 is employed between the surfaces of the barrel sleeve 14 and the connector 17.

The present invention employs a first seal 23 and a second seal 22. A spacer 26 is interposed between the first seal 23 and the second seal 22. Spacer 26 maintains the separation of the first and second seals at all times. The first and second seals are generally cylindrically shaped. However, from a review of FIG. 1A it will be noted that the first seal 23 has a first leg portion 55 and a second leg portion 56. The first seal of the preferred embodiment is generally U-shaped as can be seen from FIG. 1A and FIG. 1C. FIG. 1C illustrates a crown 55' on the first leg 55 and a crown 56' on the second leg 56 of the first seal. These crowns assist in sealing when pressure is applied to the U-shaped seal. When pressure is applied as indicated by reference numeral 74 of FIG. 1A this tends to expand the first and second legs of the first seal outwardly generating a good seal.

The second seal 22 has a first leg 53 and a second leg 54. The first leg 53 of the second seal has a crown 53' thereon. The second leg 54 of the second seal 22 has a crown 54' thereon. When pressure is applied to the seal the legs 53 and 54 tend to expand outwardly thus effecting a good seal.

The same principle applies with respect to the third seal 24. Third seal 24 has a first leg 57 and a second leg 58. The first leg has a crown 57' and the second leg has a crown 58'. When pressure is applied to the interior of the U-shaped third seal 24, it expands the legs 57 and 58 outwardly effecting a good seal.

A washer 25 is interposed between the first seal 23 and the third seal 24. As shown in FIGS. 1 and 1A there is no gap between the first seal 23, the washer 25, and the first leg 57 of the third seal 24. Pressure is applied from a gas source to which the connector is affixed. The pressure is typically at 3,000 psi gauge or higher. As shown in FIG. 1 when pressure is applied to the connector as illustrated by reference numeral 27, the second passageway 38 is pressurized as is the second port 28. The second port 28 permits natural gas to act upon the first seal 23 and the second seal 22 preventing escape of gas outside the dispenser half or into the first port or first passageway of the dispenser.

Intermediate member 19 is threadably affixed to the connector 17. Reference numeral 20 indicates the threaded interconnection between the intermediate member 19 and the connector 17. In a similar fashion the body 13 is threadably interconnected to the intermediate member. Threaded interconnection 34 is shown in FIG. 1.

Body member 13 includes apertures 75 and 76. Apertures 75 and 76 are circumferentially spaced apertures residing in the body 13. First locking balls 8 sometimes referred to as first locking detents 8 reside in apertures denoted by reference numeral 76. Second locking balls 9 reside in circumferentially spaced apertures denoted by reference numeral 75. Both the intermediate member 19 and the body member are generally cylindrically shaped.

Dispenser valve 12 acts in combination with retainer 10, sliding sleeve 11, and locking sleeve 7 to pressure lock the dispenser half and the receptacle half together under certain circumstances. Pressure greater than 350 psig applied to the dispenser half locks the dispenser half and the receptacle half together. Dispenser valve 12 further includes a flow port 51.

In FIG. 1 the receptacle half 1 is shown entering the female half of the coupling referred to herein alternately as the dispenser half of the coupling and the nozzle half of the coupling. The receptacle half includes a face 42 for engagement with the sliding sleeve 11 and dispenser valve 12. In FIG. 1 pressure has been relieved through vents by venting said pressure from the first passageway 38' through the first port 29, the slot 21 and the relief passageway 37. In FIG. 1 no pressure is being applied to the dispenser valve. The dispenser valve 12 includes face 52 exposed to whatever pressure is in the first passageway 38'. In FIG. 1 no pressure is being applied to the face 52 of the dispenser valve 12. A spring 33 operates between the connector 17 and a shoulder on the dispenser valve 12. The spring forcibly engages the dispenser 12 to the closed position against retainer 10. Retainer 10 is shown engaging the body 13. In similar fashion the sliding sleeve is also shown engaging the body 13 under the bias of sliding sleeve spring 35 operating between the retainer and the sliding sleeve 11.

FIG. 1 illustrates the receptacle half entering into the dispenser half which causes the first locking balls 8 to be pushed up in housing or aperture 76.

Figure 4:
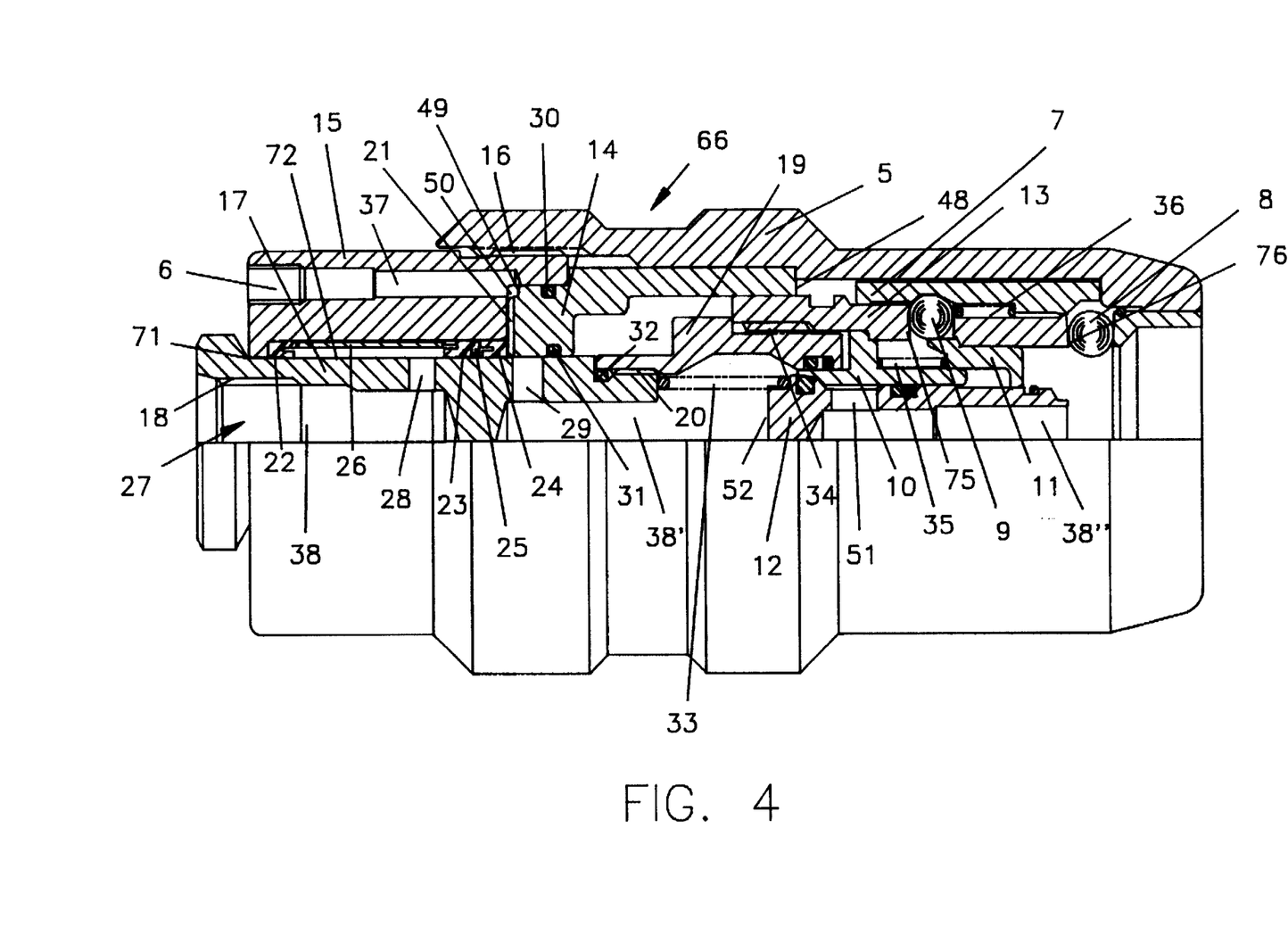
FIG. 4 illustrates a quarter sectional view of the dispenser half of the present invention.

In FIG. 1 the second passageway 38 is pressurized as is the first port 28. The first seal 23 and the second seal 22 are shown sealing the second port 28 of the second passageway 38. FIG. 4 shows the dispenser half 66 alone. FIG. 4 illustrates that the first locking balls 8 have dropped down in the circumferentially spaced aperture 76.

Figure 1B:
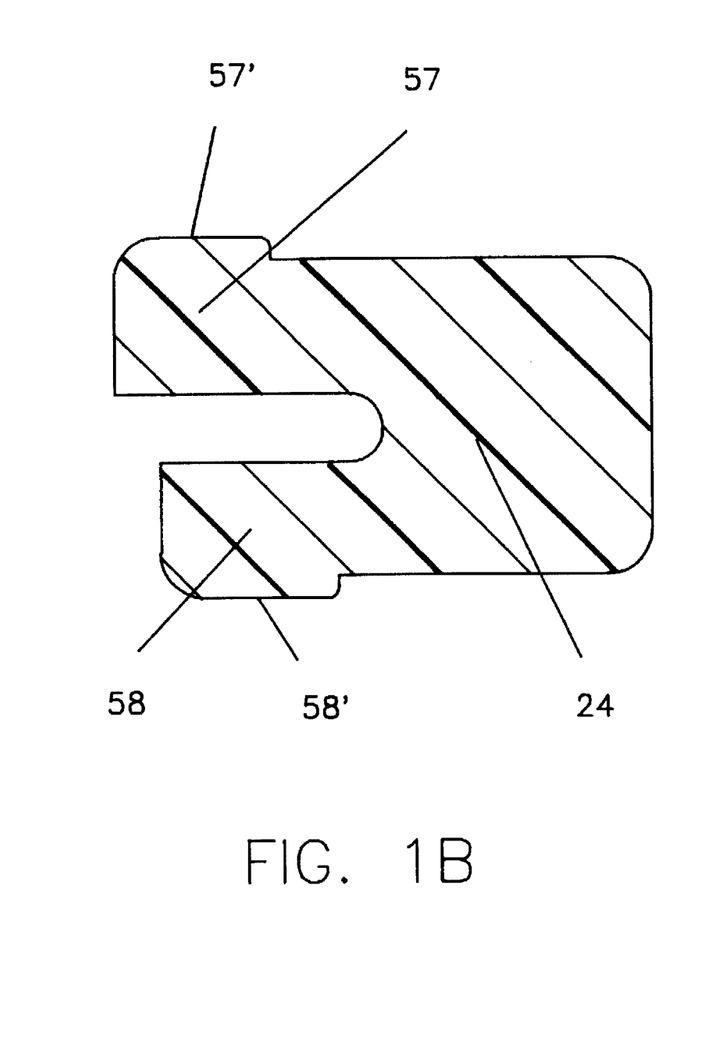
FIG. 1B is an enlarged cross-sectional view of the third seal 24.
Figure 1C:
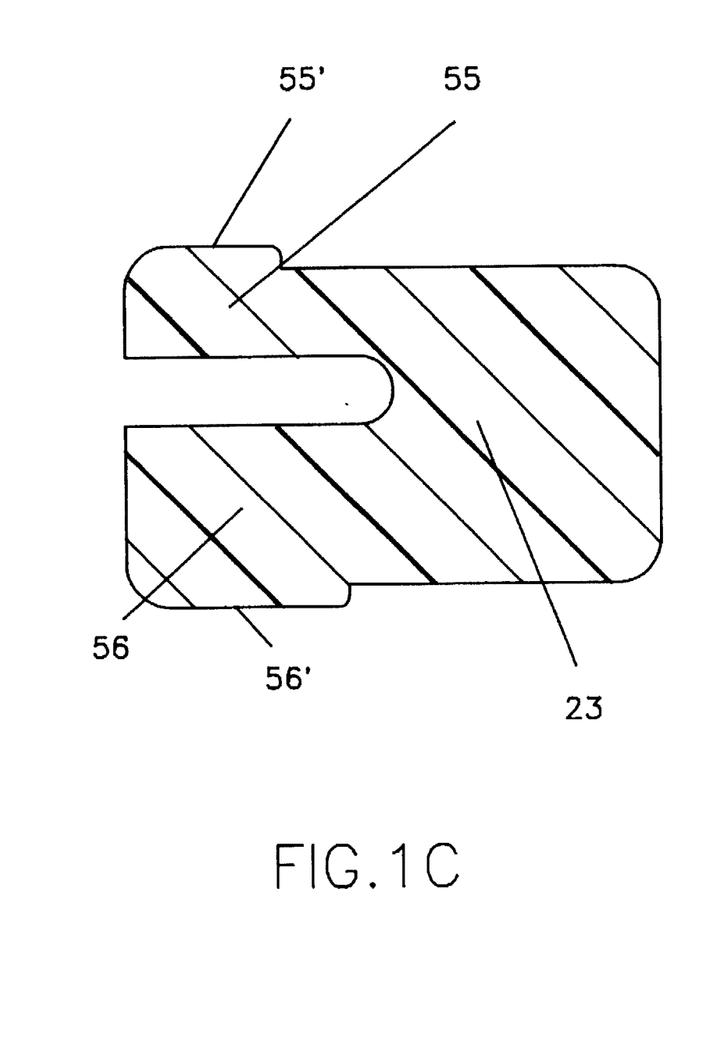
FIG. 1C is an enlarged cross-sectional view of the first seal.

FIG. 1B is an enlarged cross-sectional view of the third seal 24. The seals of the preferred embodiment may be made from materials such as DELRIN®, NYLATRON®, and PEEK, all of which have been found to be satisfactory for use as the first seal, the second seal and the third seal. PEEK is an abbreviation for polyetheretherketone material. DELRIN® is a trademark of E. I. DuPont de Nemours of Wilmington, Del. DELRIN® is a homopolymer acetal material. NYLATRON® is a trademark of The Polymer Corporation of Reading, Pa. NYLATRON® is a molybdenum disulphide filled nylon material.

FIG. 1B is an enlarged cross-sectional view of the third seal 24. It will be noted that the third seal 24 includes a first leg 57 and a second leg 58. The second leg 58 is shorter in length than the first leg 57. The third seal includes a crown 57' on the first leg and a crown 58' on the second leg.

FIG. 1A illustrates that there is no space between the first seal 23, the washer 25, and the third seal 24. There is no space because pressure is applied through the second passageway 38 and second port 28 and against the first seal 23. Pressure secures the first seal 23 into engagement with the washer 25. Washer 25 is in engagement with the third seal 24. Further, the second seal 22 is identical to the third seal.

The second seal 22 includes a first leg 53 having a crown 53' thereon and a second leg 54 having a crown 54' located thereon. Spacer 26 resides between the first seal 23 and the second seal 22. The spacer 26 of the preferred embodiment resides loosely between the first seal 23 and the second seal 22. However, those skilled in the art would readily recognize that another spacer may be employed which is larger in size which does not fit as loosely or loosely at all between the first and second seals.

The first seal 23 has a first leg 55 and a second leg 56. The first leg 55 has a crown 55' located thereon, the second leg 56 has a second crown 56' located thereon. It will be noted that with respect to the first seal, the second seal, and the third seal that all of the seals are generally U-shaped in the preferred embodiment. The application of pressure to the internal portion of the seals (22, 23 and 24) tends to push the first and second legs of the seal members outwardly and into engagement with the adapter 15 and the connector 17. In particular, the crown 55' of the first leg 55 of the first seal engages the adaptor when pressure is applied at reference numeral 74. In similar fashion the crown 56' located on the second leg 56 of the first seal 23 engages the connector 17 when pressure is applied at reference numeral 74 of the first seal. This same general principle applies to the second and third seals as well.

Figure 1D:
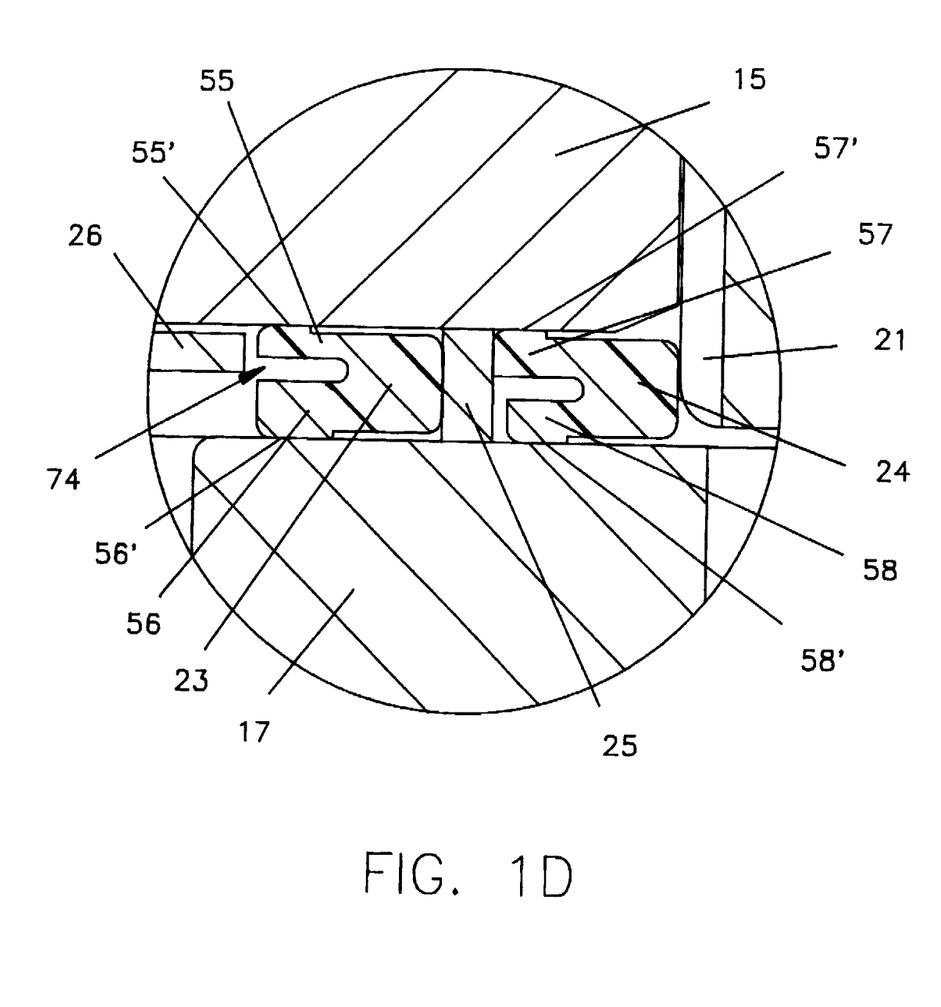
FIG. 1D is an enlarged cross-sectional view illustrating the first seal 23 abutting the washer which in turn abuts the third seal 24.

FIG. 1D is an enlarged cross-sectional view showing the first seal 23, the washer 25, and the third seal 24. FIG. 1D illustrates the first seal 23 engaging the washer 25. In a similar fashion the washer abuts the third seal 24. Finally, the third seal 24 abuts the second end portion 49 of the barrel sleeve 14.

Figure 2:
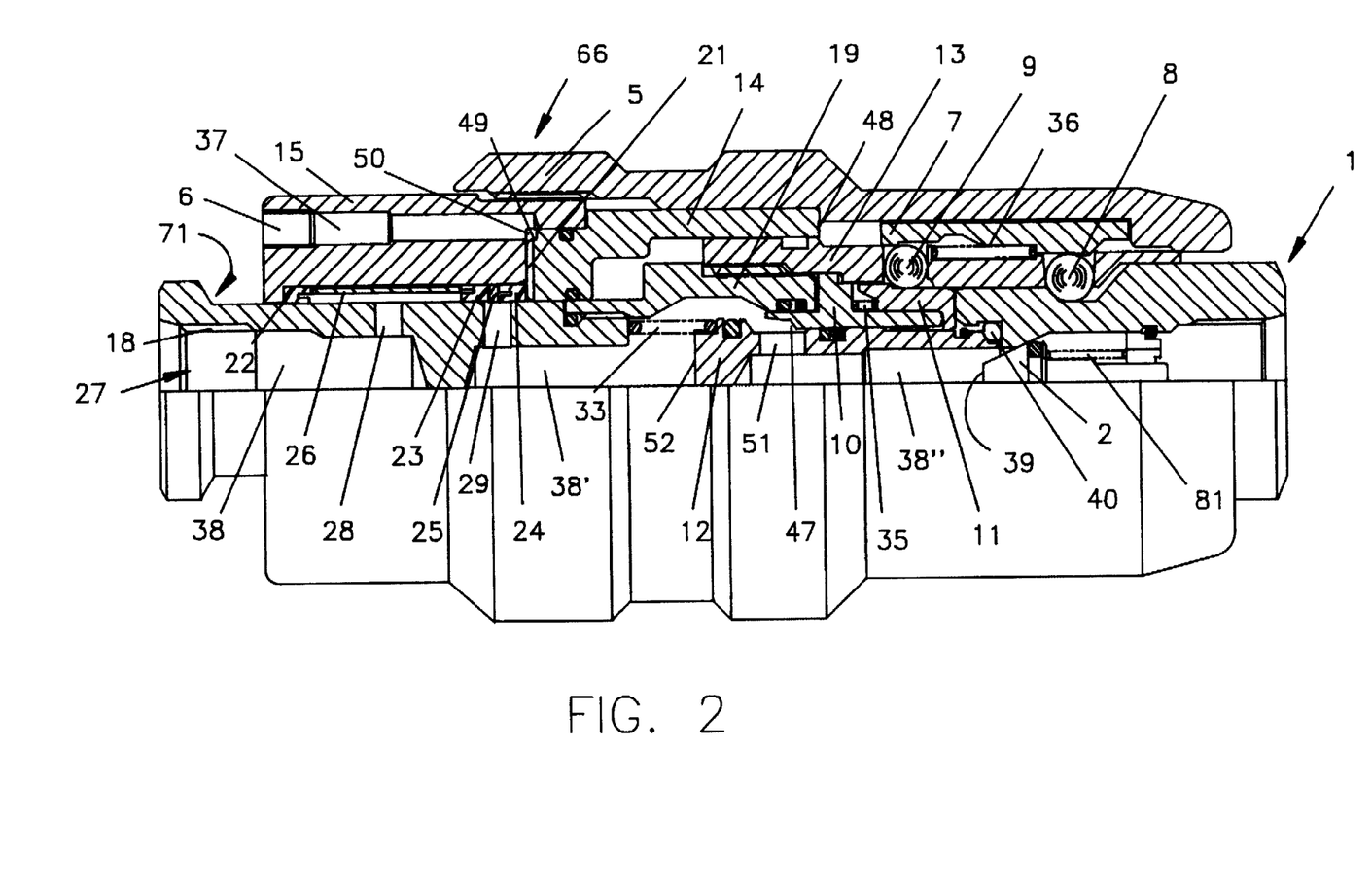
FIG. 2 illustrates a quarter sectional view of the dispenser half and receptacle half in engagement.
Figure 3:
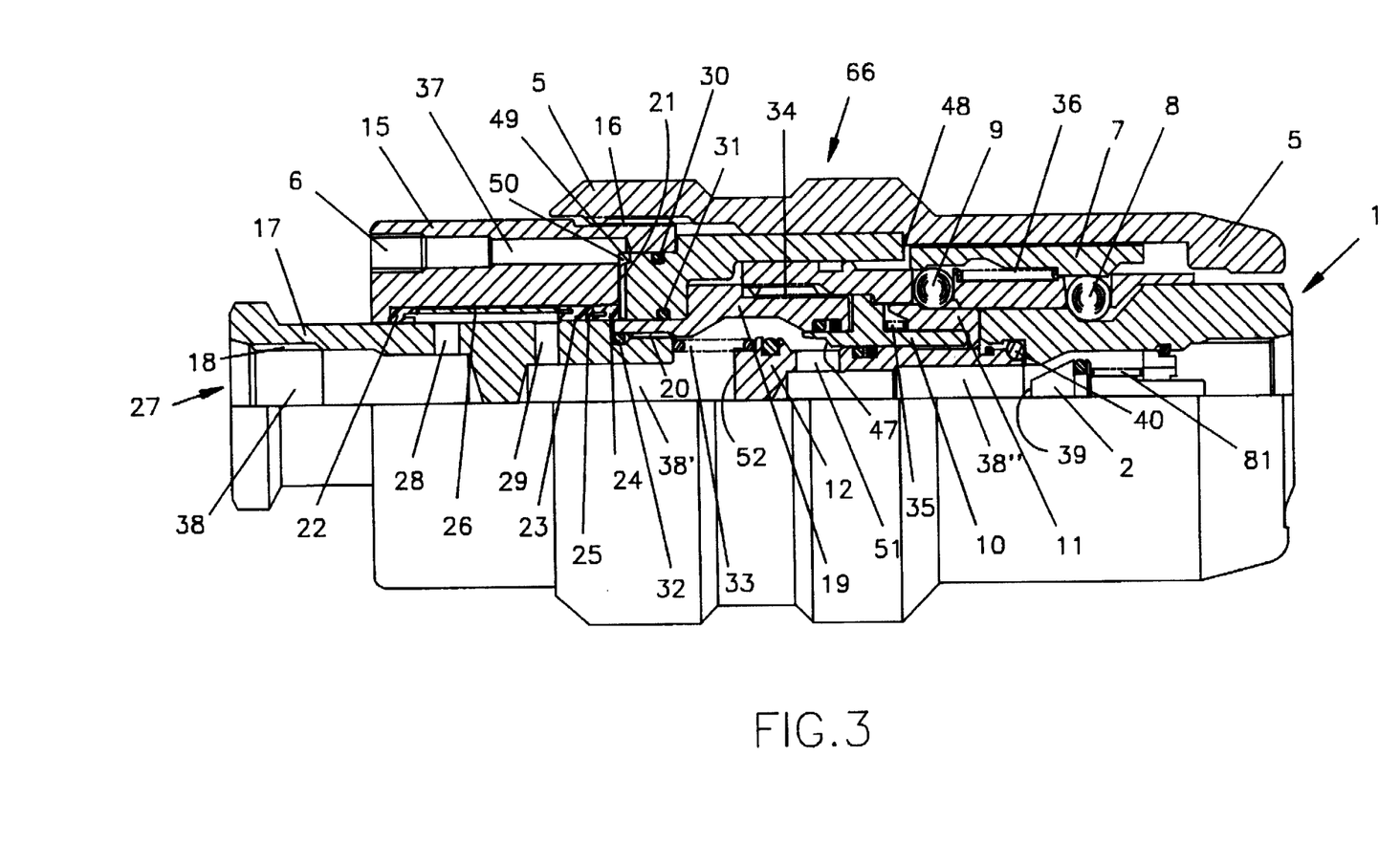
FIG. 3 illustrates the dispenser half 66 and the receptacle half 1 fully connected.

FIG. 2 illustrates the vent position of the dispenser half. FIG. 2 further illustrates that venting occurs while the dispenser half 66 and the receptacle half 1 are engaged. The operational circumstance represented by FIG. 2 occurs subsequent to the fully connected position of the dispenser half and the receptacle half as illustrated in FIG. 3. FIG. 2 illustrates that the bumper 5 together with the barrel sleeve 14 and adaptor 15 have been partially retracted leftwardly in FIG. 2. In particular FIG. 2 illustrates that the bumper, barrel sleeve, and adaptor have been retracted so as to position the first seal 23 and second seal 22 about the second port 28 of the second passageway 38.

In the vent position the pressure applied to the connector denoted by reference numeral 27 is now trapped in second passageway 38 and second port 28. The first and second seals are prohibiting release of this gas to port 29 and first passageway 38'. FIG. 2 represents the vent position of the dispenser half meaning that the first passageway 38' is being vented through the first port 29, around the third seal 24, through slot 21 of the barrel sleeve 14, through the annular volume indicated by reference numeral 50, and through the relief passageway 37 of the adaptor 15. The relief passageway 37 of the adaptor 15 leads to a port 6 of the adaptor which is connected to a recycling chamber for the gas which has been vented off and accumulated. There is a check valve not shown in the recycled gas system so as to prohibit the gas flowing back from the recycled gas system into the adaptor 15.

Dispenser valve 12 includes a third passageway 38" and a dispenser port 51. FIG. 2 illustrates the condition of the dispenser half whereby the gas in the third passageway 38' is vented through the first port 29, around the third seal, and out through the slot in barrel sleeve 14 as discussed above. Once the pressure within the third passageway 38" and the first passageway 38' decreases to a certain point, the check valve 2 of the receptacle half will go to its closed position. The check valve 2 of the receptacle half is shown in its closed position in FIG. 2. This is the condition whereby the pressure has been reduced sufficiently low enough to permit the check valve 2 to close. When the pressure in the third passageway 38" and the first passageway 38' decreases to a certain pressure, the spring 33 operating between the connector and the dispenser valve will urge the dispenser valve 12 to the closed position. Simultaneously with this action the retainer 10, the sliding sleeve 11, the sliding sleeve spring 35, the locking balls 8 and 9, the locking sleeve 7, and the locking sleeve spring 36, unlock the receptacle half 1 from the dispenser half. This allows the first locking balls 8 to exit the groove 4 in the receptacle half 1.

FIG. 1 shows the position of the dispenser half 66 as the receptacle half 1 begins to enter the dispenser half 66. FIG. 1 illustrates the first locking balls 8 having been raised by virtue of the receptacle half's entry into the dispenser half. Further entry of the receptacle half into engagement with the dispenser half causes the sliding sleeve to move permitting the second locking balls 9 to drop. Further entry of the receptacle half into engagement with the dispenser half moves the dispenser half to the open position. FIG. 1 illustrates the adaptor 15, the barrel sleeve 14 and the bumper 5 such that port 28 and second passageway 38 are sealed. In FIG. 1, the operator has urged the adaptor, barrel sleeve, and body to the position shown in FIG. 1.

FIG. 4 illustrates the dispenser half alone. FIG. 4 illustrates the dispenser half similar to that shown in FIG. 1 with the exception that the locking balls 8 are shown having dropped down in their respective apertures 76. FIG. 4 illustrates that the adaptor 15, the barrel sleeve 14, and the bumper 5 may assume any one of a number of a plurality of positions. For instance even if the adaptor sleeve 15, the barrel sleeve 14, and the body assume a rightwardly position such that the barrel sleeve 14 engages the intermediate member 19, dispenser valve 12 remains closed. Dispenser valve 12 remains closed even though pressure has been applied to the first passageway 38'. Therefore, while the dispenser half 66 is disengaged from the receptacle half 1, the adaptor 15, barrel sleeve 14, and bumper 5 may assume any one of a plurality of positions without opening the dispenser valve 12. Bumper 5, barrel sleeve 14 and adaptor 15 may be moved to the extreme leftwardly or rightwardly positions as shown in FIG. 4 without opening the dispenser valve. Only the entry of face 42 of the receptacle half into engagement with the sliding sleeve opens dispenser valve 12. Referring to FIG. 3 the dispenser half 66 and the receptacle half 1 are securely engaged. In FIG. 3 the system pressure entering the dispenser half designated by reference numeral 27 is present in the first passageway 38', the second passageway 38, and the third passageway 38". Check valve 2 of the receptacle half is shown in its open position. Check valve 2 includes a face 39 which is exposed to system pressure. Dispenser valve 12 is illustrated in its opened position. System pressure 27 at or about 3,000 psi gauge is applied to the leading surface 47 of the retainer 10. This has the effect of pressure locking the first and second locking balls as explained in U.S. Pat. No. 5,323,812 issued Jun. 28, 1994. Various elastomeric seals are illustrated in FIG. 3 which seal between the dispenser valve and the retainer, the retainer and the intermediate member, and the dispenser valve 12 and the receptacle. Additionally in regard to the receptacle half, various elastomeric seals are indicated for sealing the check valve when it is in its closed position.

Figure 2A:
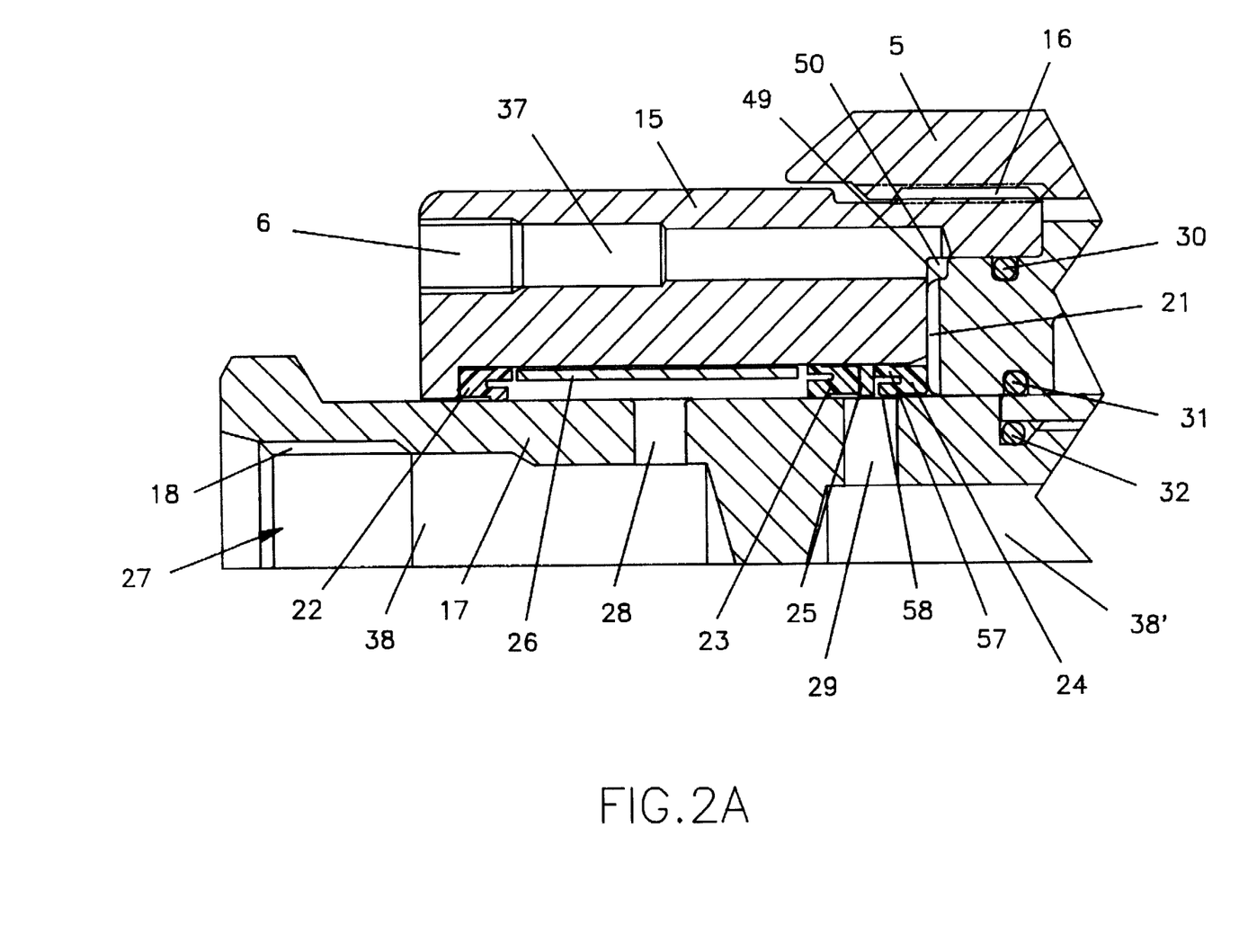
FIG. 2A is an enlarged cross-sectional view of a portion of FIG. 2.

FIG. 3 illustrates the dispenser half and the receptacle half fully connected with all passageways and ports under system pressure. When the operator is finished fueling, the receptacle half check valve will close under the bias of the receptacle half check valve spring 81. The operator filling his or her vehicle gas tank will be alerted that the fueling process of the tank has been completed by an external flow indication. At this point in time the operator will then begin disconnecting the dispenser half from the receptacle half. To do this the operator must retract the bumper 5 to the vent position as shown in FIG. 2. When the bumper 5, the barrel sleeve 14, and the adaptor 15 are retracted to the vent position as shown in FIG. 2 and FIG. 2A, the pressure in the first passageway 38' and a third passageway 38" is reduced to a predetermined level.

Once this predetermined pressure is reached in the first and third passageways the pressure locking means as previously described herein is unlocked and the operator may then further retract leftwardly the bumper 5, the barrel sleeve 14, and the adaptor 15 to the position shown in FIGS. 1 and 1A. Simultaneously with the retraction of the bumper 5, the barrel sleeve 14, and the adaptor 15, the adaptor 15 engages the connector at point 71. Shoulder 71 of the connector 17 prohibits further leftwardly movement of the adaptor 15. Additionally as the operator is moving the bumper, barrel sleeve, and adaptor combination leftwardly, this causes a force to be exerted on shoulder 71 of the connector 17 which moves the dispenser half 66 generally in a direction away from the receptacle half 1. Leftwardly movement for retraction of bumper 5 causes engagement and retraction of locking sleeve 7 against the bias of locking sleeve spring 36. The leftwardly retraction of locking sleeve 7 under the influence of bumper 5 permits the locking balls 8 and 9 to move upwardly permitting extraction of the first locking balls 8 from the groove 4 of receptacle 1 and permitting the second locking balls 9 to move upwardly locking the locking sleeve 7.

Locking sleeve 7 has two positions. A first position shown in FIG. 4 when the dispenser half is completely disconnected from the receptacle half. The second position is when the receptacle half and the dispenser half are completely connected as shown in FIG. 3. It will be noted from FIG. 3 that the second position of the locking sleeve is restrained from further rightwardly movement by the second locking balls 9.

Figure 3A:
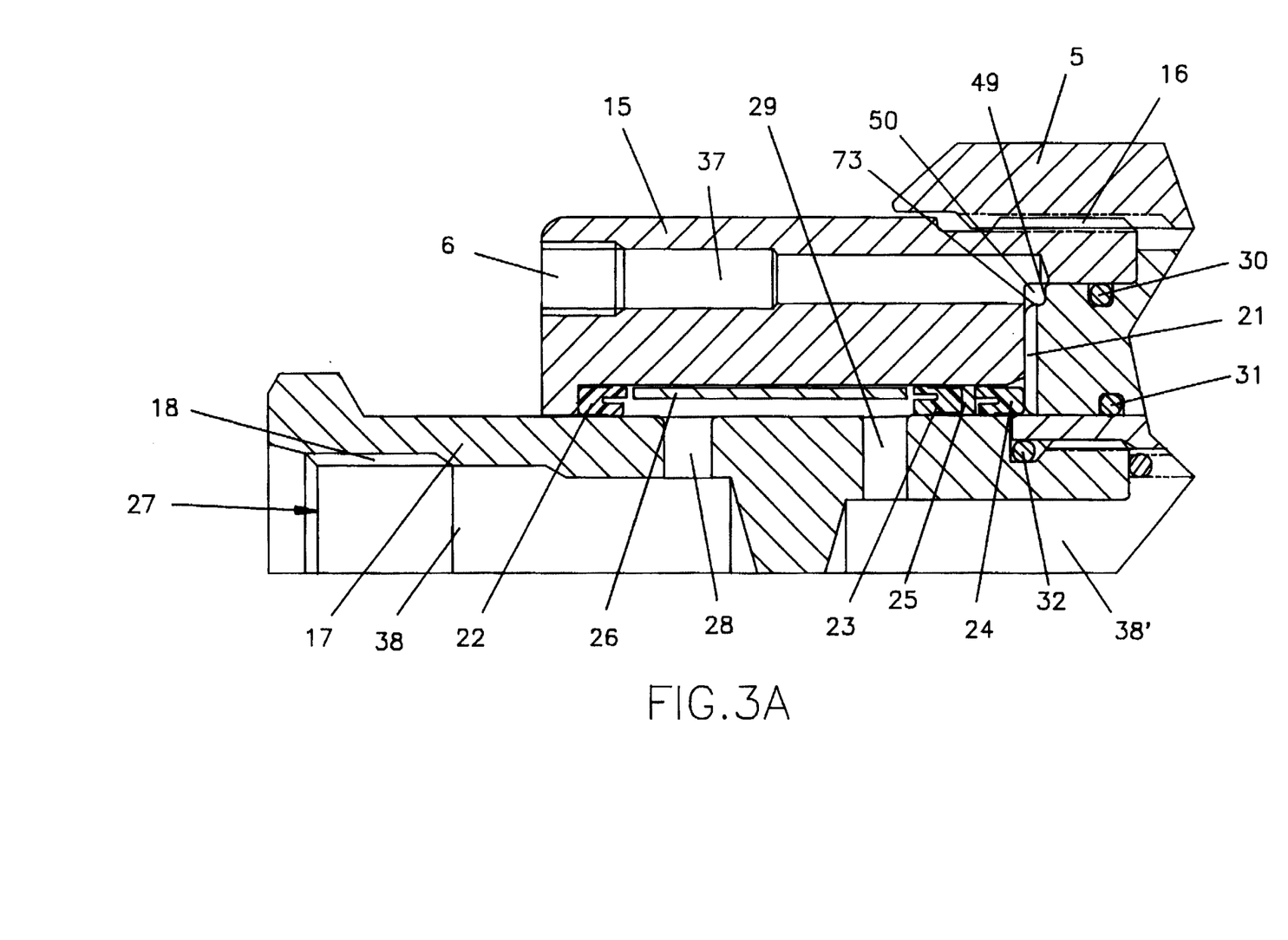
FIG. 3A illustrates an enlarged sectional portion of the dispenser half and receptacle half shown in FIG. 3.

FIG. 3 further illustrates the adaptor 15, barrel sleeve 14, and bumper 5 in its extreme rightwardly position. In particular, the barrel sleeve 14 is shown engaging the intermediate member 19. FIG. 3A is an expanded view of a section of the dispenser half as shown in FIG. 3. FIG. 3A illustrates the first seal 23 and the second seal 22 sealing the first port 29 and the second port 28. FIG. 3A illustrates that the first and second seals prohibit any leakage of gas to the exterior of the dispenser half and the slot 21. FIG. 3A further illustrates the first seal 23 engaging the washer 25. The washer 25 is also similarly shown engaging the third seal 24. The third seal 24 is illustrated in FIG. 3A as engaging the second end portion 49 of the barrel sleeve 21. The second end portion 49 of barrel sleeve 14 further includes a milled end surface 73. This milled end surface 73 extends annularly about the second end portion 49 of the barrel sleeve 14. This creates an annular space or void 50 for communication with the slot 21 of the barrel sleeve 14. There may be any number of slots 21 in the barrel sleeve 14. A larger number of slots 21 will increase the flow therethrough. The annular space 50 has the advantageous effect of making orientation of the slots with respect to the relief passageway 37 unimportant. The annular passageway 50 insures that regardless of the number of slots 21 employed that the vent passageway will function effectively.

Figure 2B:
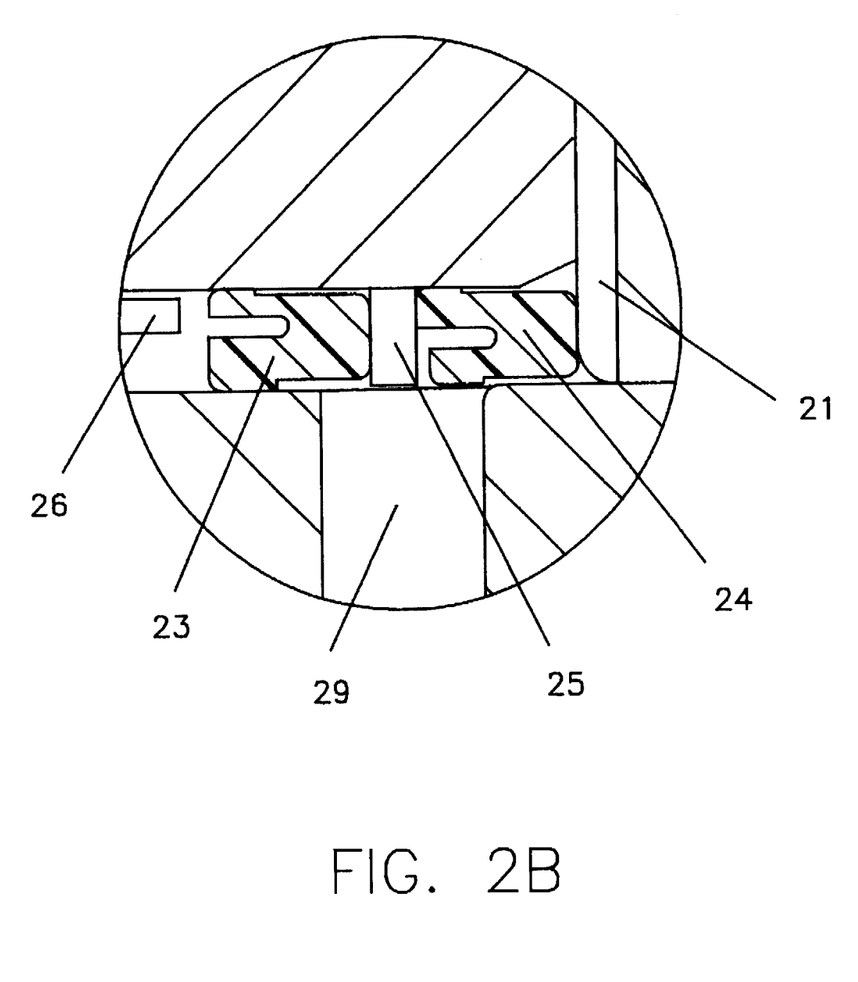
FIG. 2B illustrates an enlarged view of the third seal 24, the vent path 29 and the slot 21 of the barrel sleeve.

FIG. 2 illustrates the dispenser half and the receptacle half joined together, the dispenser half, the bumper 5, the barrel sleeve 14, and the adaptor 15, being positioned such that the first passageway 38' an the second passageway 38" are vented. FIG. 2A illustrates a portion of the dispenser half as shown in FIG. 2 wherein it is illustrated that the first passageway 38', the first port 29, the third seal 24, the slot 21, the annular passageway 50, and the relief passageway 37 communicate to permit venting of the first passageway 38'. FIG. 2B illustrates in detail the vent path past the third seal 24. It will be noted from a review of FIG. 2B that the shape of the seal 24 is such that flow is permitted past the third seal 24.

As can be seen from above, the present invention includes a unique sealing mechanism which permits connection of a dispenser half to a receptacle half by an operator using a single hand. Similarly, the dispenser half may be disconnected from the receptacle half using a single hand. Disconnection requires first that the pressure in the dispenser half be vented to an accumulator which permits the unlocking of the dispenser half from the receptacle half. Next the dispenser half is separated from the receptacle half by the operator using a single hand. The adaptor, barrel sleeve, and bumper are retracted causing the adaptor to engage the connector which forcibly disconnects the dispenser half from the receptacle half.

The invention has been described in detail with particular emphasis on the preferred embodiments thereof, but it should be understood that variations and modifications within the spirit and scope of the invention may occur to those skilled in the art to which the invention pertains.

What is claimed is:

1. A dispenser half comprising a connector, a barrel sleeve, a moveable adaptor, said connector includes first and second passageways, said first passageway of said connector further includes a first port and said second passageway includes a second port, a first seal and a second seal residing between said connector and said adaptor, said adaptor engaging said barrel sleeve, a spacer between said first and second seals maintaining separation of said first and second seals, said moveable adaptor positioning said first and second seals in one of a plurality of positions.

2. A dispenser half as claimed in claim 1 wherein said first and second seals are positioned about said second port of said second passageway.

3. A dispenser half as claimed in claim 1 wherein said first and second seals are positioned about said first port of said first passageway and said second port of said second passageway.

4. A dispenser half comprising a connector, a barrel sleeve, a moveable adaptor, said connector includes first and second passageways, said first passageway includes a first port and said second passageway includes a second port, a first seal, a second seal, and a third seal residing between said connector and said adaptor, said adaptor engaging said barrel sleeve, a spacer between said first and second seals maintaining separation of said first and second seals, a washer between said first and said third seals maintaining separation of said first and third seals, said movable adaptor positioning said first, said second, and said third seals in one of a plurality of positions.

5. A dispenser half as claimed in claim 4 wherein said first and second seals are positioned about said second port of said second passageway.

6. A dispenser half as claimed in claim 4 wherein said first and second seals are positioned about said first port of said first passageway and said second port of said second passageway.

7. A dispenser half as claimed in claim 4 wherein said barrel sleeve includes a first end portion and a second end portion.

8. A dispenser half as claimed in claim 7 wherein said barrel sleeve further includes a slot in said second end, and said adaptor includes a relief passageway communicating with said slot in said second end of said barrel sleeve.

9. A dispenser half as claimed in claim 8 wherein said first and said second seals are positioned about said second port of said second passageway and said third seal is positioned intermediate said first port of said first passageway and said slot of said barrel sleeve.

10. A dispenser half as claimed in claim 9 wherein said third seal permits passage of gas therearound.

11. A dispenser half as claimed in claim 9 wherein said third seal permits: passage of gas from said first passageway of said connector; through said first port of said first passageway of said connector; around said third seal; through said slot of said barrel sleeve; and through said relief passageway of said adaptor.

12. A dispenser half as claimed in claim 10 in combination with a receptacle half, said dispenser half further comprising means for pressure locking said dispenser half and said receptacle half together.

13. A dispenser half as claimed in claim 11 in combination with a receptacle half, said dispenser half further comprising means for pressure locking said dispenser half and said receptacle half together.

14. A dispenser half as claimed in claim 10 further comprising: an intermediate member affixed to said connector; a body member affixed to said intermediate member; first and second locking balls carried in said body member; a dispenser valve; a retainer; a sliding sleeve; a locking sleeve; said retainer disposed between said dispenser valve, said intermediate member, said sliding sleeve and said body; a bumper member affixed to said movable adaptor; a sliding sleeve spring residing between said retainer and said sliding sleeve; a locking sleeve spring residing between said body and said locking sleeve; a dispenser spring residing between said dispenser valve and said connector and urging said dispenser valve to the closed position.

15. A dispenser half as claimed in claim 14 in combination with a receptacle half; said receptacle half engaging said dispenser valve, said sliding sleeve and said first locking balls of said dispenser half; said receptacle half opening said dispenser valve; said connector being connected to a pressure source, said pressure being applied to said retainer which in combination with said sliding and locking sleeves and springs locks said receptacle half and said dispenser half together.

16. A dispenser half as claimed in claim 11 further comprising: an intermediate member affixed to said connector; a body member affixed to said intermediate member; first and second locking balls carried in said body member; a dispenser valve; a retainer; a sliding sleeve; a locking sleeve; said retainer disposed between said dispenser valve, said intermediate member, said sliding sleeve and said body; a bumper member affixed to said movable adaptor; a sliding sleeve spring residing between said retainer and said sliding sleeve; a locking sleeve spring residing between said body and said locking sleeve; a dispenser spring residing between said dispenser valve and said connector and urging said dispenser valve to the closed position.

17. A dispenser half as claimed in claim 16 in combination with a receptacle half; said receptacle half engaging said dispenser valve, said sliding sleeve and said first locking balls of said dispenser half; said receptacle half opening said dispenser valve; said connector being connected to a pressure source, said pressure being applied to said retainer which in combination with said sliding and locking sleeves and springs locks said receptacle half and said dispenser half together.

18. A dispenser half as claimed in claim 4 wherein said first and said second seals are made of a molybdenum disulphide filled nylon material.

19. A dispenser half as claimed in claim 4 wherein said first and second seals are made of a homopolymer acetal material.

20. A dispenser half as claimed in claim 4 wherein said first and second seals are made of a polyetheretherketone material.

21. A dispenser half comprising a connector; a barrel sleeve; a moveable adaptor; said connector includes first and second passageways; said first passageway further includes a first port and said second passageway includes a second port; a first seal, a second seal 22, and a third seal residing intermediate said connector and said adaptor; a spacer residing intermediate said first and said second seals maintaining separation of said first and said second seals; a washer residing intermediate said first and said third seals maintaining separation of said first and said third seals; said barrel sleeve further includes a first end portion and a second end portion; said second end portion of said barrel sleeve further includes a slot; said adaptor includes a relief passageway communicating with said slot in said second end portion of said barrel sleeve; an intermediate member affixed to said connector; a body member affixed to said intermediate member; first and second locking balls; said body member includes a plurality of circumferentially spaced apertures housing said first and second locking balls; a sliding sleeve; a retainer; a locking sleeve; a dispenser valve moveable between open and closed positions; said retainer disposed between said dispenser valve, said intermediate member, said sliding sleeve and said body; a bumper member; said bumper member affixed to said moveable adaptor; said bumper member securing said barrel sleeve into engagement with said moveable adaptor; a first spring residing between said connector and said moveable dispenser valve urging said dispenser valve to said closed position valve; a second spring residing between said retainer and said sliding sleeve; a third spring residing between said body member and said locking sleeve; and, said moveable adaptor positioning said first seal, said second seal and said third seal in one of a plurality of positions.

22. A dispenser half as claimed in claim 21 wherein said first, said second, and said third seals are generally U-shaped.

23. A dispenser half as claimed in claim 21 wherein a pressure source is applied to said connector and wherein said dispenser valve includes a face; and said pressure source urges said dispenser valve to the closed position.

24. A dispenser half as claimed in claim 21 wherein said first and said second seals are positioned about and seal said second port of said second passageway of said connector.

25. A dispenser half as claimed in claim 21 wherein said first and said second seals are positioned about said second port of said second passageway and said first port of said first passageway of said connector.

26. A dispenser half as claimed in claim 24 wherein said third seal resides intermediate said first port of said first passageway and said slot of said first end of said barrel sleeve interconnecting said first passageway to said slot and venting said first passageway.

27. A dispenser half as claimed in claim 25 in combination with a receptacle half and a pressure source applied to said connector of said dispenser half; said receptacle half further comprising a check valve and a body; said body having a face; said face of said body of said receptacle engages said dispenser valve of said dispenser half urging said dispenser valve to said open position; said face of said body of said receptacle repositioning said sliding sleeve which, in combination with the application of pressure to said retainer and positioning of said dispenser valve to open position, secures said locking sleeve and said first and said locking balls such that said dispenser half and said receptacle half are locked together.

28. A pressure locking dispenser half comprising a connector; said connector having an exterior; a moveable adaptor; a barrel sleeve; said connector having a first passageway and a second passageway therein; a first port extending from said first passageway to said exterior of said connector; a second port extending from said second passageway to said exterior of said connector; said barrel sleeve having a first end portion and a second end portion; said second end portion of said barrel sleeve includes a slot; said barrel sleeve being affixed to said moveable adaptor; said moveable adaptor includes a relief passageway; a first seal; a second seal and a third seal; a spacer; said spacer maintaining separation of said first seal and said second seal; a washer; said washer maintaining separation of said first seal and said third seal; said first seal, said second seal, said third seal, said spacer, and said washer residing between said connector and said adaptor; and, said moveable adaptor positioning said first, said second, and said third seals in one of a plurality of positions.

29. A pressure locking dispenser half as claimed in claim 28 wherein said first and second seals are generally U-shaped.

30. A pressure locking dispenser half as claimed in claim 29 wherein said third seal is generally U-shaped.

31. A pressure locking dispenser half as claimed in claim 30 wherein said U-shaped third seal has a first leg and a second leg, said first leg being shorter than said second leg.

32. A pressure locking dispenser half as claimed in claim 29 wherein said first U-shaped seal includes a first leg and a second leg, and wherein said second U-shaped seal includes a first leg and a second leg.

33. A pressure locking dispenser half as claimed in claim 32 wherein said first and second seals are pressure sensitive.

34. A pressure locking dispenser half as claimed in claim 29 wherein said moveable adaptor positions said first and second seals about said second port of said second passageway.

35. A pressure locking dispenser half as claimed in claim 34 wherein said first and second seals are pressure sensitive, and further including a pressure source applied to said connector, and said first and said second seals engaging said connector and said adaptor.

36. A pressure locking dispenser half as claimed in claim 29 wherein said moveable adaptor positions said first and second seals about said first port of said first passageway and said second port of said second passageway.

37. A pressure locking dispenser half as claimed in claim 36 wherein said first and second seals are pressure sensitive, and further including a pressure source applied to said connector, and said first and said second seals engaging said connector and said adaptor.

38. A pressure locking dispenser half as claimed in claim 31 wherein said moveable adaptor positions said first and second seals about said second port of said second passageway and said third seal resides intermediate said first port of said first passageway and said slot of said barrel sleeve, said first passageway venting through said first port, said slot of said barrel sleeve and said relief passageway of said moveable adaptor.

39. A dispenser half as claimed in claim 38 wherein said first and second passageways of said connector are pressurized with a gas.

40. A dispenser half as claimed in claim 39 wherein said first, second, and third seals are a homopolymer acetal material.

41. A dispenser half as claimed in claim 39 wherein said first, second, and third seals are a molybdenum disulphide filled nylon material.

42. A dispenser half as claimed in claim 39 wherein said first, second, and third seals are a polyetheretherketone material.

43. A dispenser half as claimed in claim 41 wherein said first and second seals are symmetrical and are pressure balanced.

44. A dispenser half as claimed in claim 21 wherein said first and second seals are symmetrical and are pressure balanced.

45. A dispenser half as claimed in claim 29 wherein said first and second seals are symmetrical and are pressure balanced.

* * * * *

UNITED STATES PATENT AND TRADEMARK OFFICE
CERTIFICATE OF CORRECTION

PATENT NO. : 5,730,185
DATED : March 24, 1998
INVENTOR(S) : Steven Wilkins, et al.

It is certified that error appears in the above-identified patent and that said Letters Patent is hereby corrected as shown below:

Col. 1, line 23, after "trapped", delete "Was" and insert -- gas --.

Col. 11, line 14, delete "22".

Signed and Sealed this

Twenty-second Day of September, 1998

Attest:

BRUCE LEHMAN

*Attesting Officer*      *Commissioner of Patents and Trademarks*